(12) United States Patent
Godard et al.

(10) Patent No.: US 6,574,533 B2
(45) Date of Patent: Jun. 3, 2003

(54) METHOD AND DEVICE FOR DISPLAYING A VELOCITY VECTOR OF AN AIRCRAFT

(75) Inventors: Eric Godard, Toulouse (FR); David Chabe, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/263,649

(22) Filed: Oct. 4, 2002

(65) Prior Publication Data

US 2003/0088342 A1 May 8, 2003

(30) Foreign Application Priority Data

Nov. 8, 2001 (FR) .............................................. 01 14450

(51) Int. Cl.$^7$ ................................................. G05D 1/00
(52) U.S. Cl. ............................. 701/3; 701/14; 244/75 R
(58) Field of Search ................................ 701/1, 3, 4, 7, 701/200, 207, 213, 14, 120; 244/3.2, 3.16, 177, 75 R; 73/178 R; 340/975

(56) References Cited

U.S. PATENT DOCUMENTS 5,016,177 A * 5/1991 Lembregts ....................... 701/3
6,389,333 B1 * 5/2002 Hansman et al. ............... 701/3

FOREIGN PATENT DOCUMENTS

EP 0044777 * 7/1989 ..................... 701/3
EP 0366164 5/1990

* cited by examiner

*Primary Examiner*—Richard M. Camby
(74) *Attorney, Agent, or Firm*—Stevens, Davis, Miller & Mosher, LLP

(57) ABSTRACT

The device (1) comprises a first means (3) for measuring the effective value of the velocity vector of the aircraft, a computing unit (4) which determines a display value automatically and repetitively and which comprises a filtering means (6) which filters the value measured by the first means (3) so as to form a first term, a display unit (7) for presenting on a screen (2) a characteristic sign illustrating the velocity vector whose position on the screen (2) is representative of the display value, and a second means (9) for determining the derivative of a velocity vector controlled by an aircraft pilot. The computing unit (4) further comprises a computing means (10) which determines a second term from the derivative of the controlled velocity vector and a summator (12) which sums the first and second terms so as to form the display value.

9 Claims, 1 Drawing Sheet

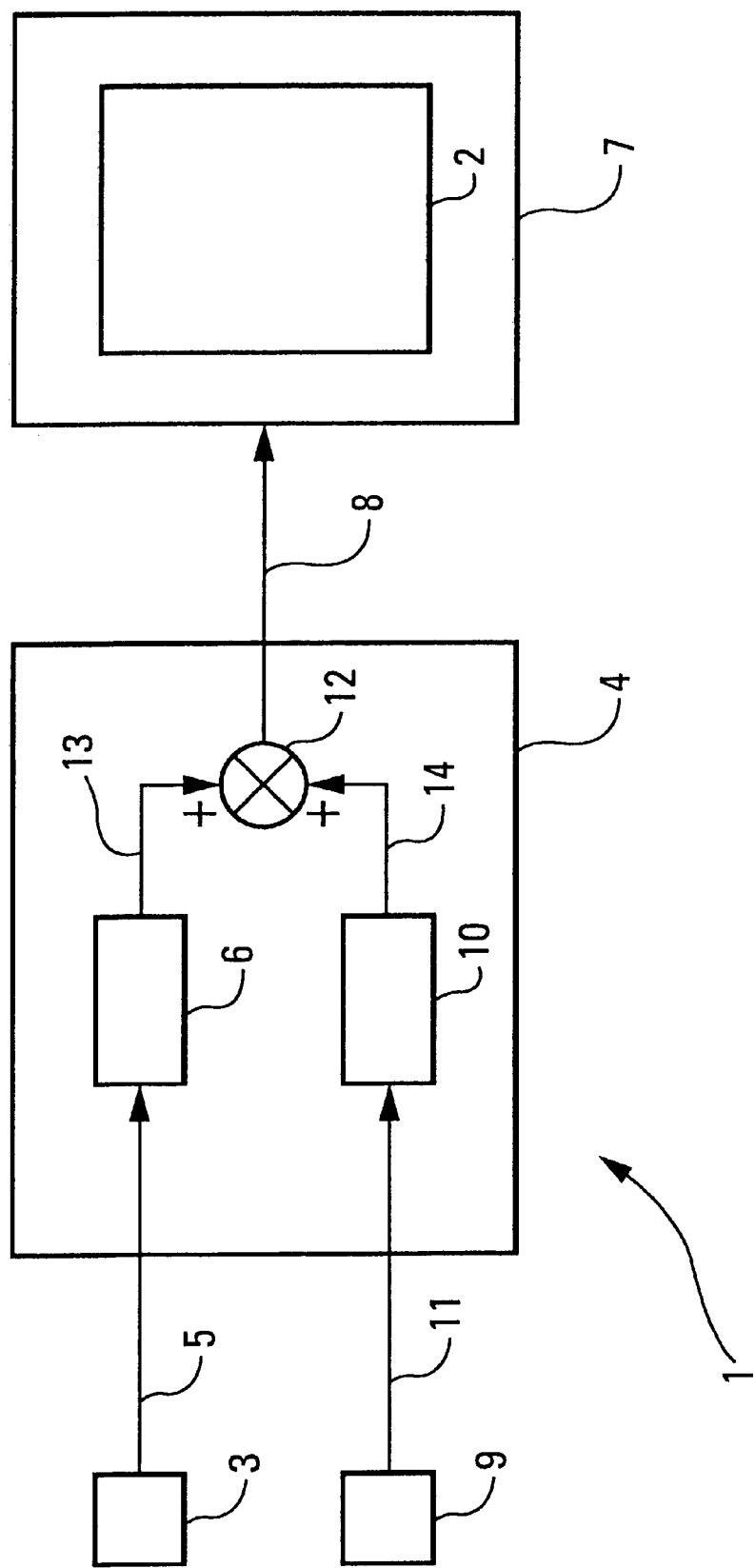

METHOD AND DEVICE FOR DISPLAYING A VELOCITY VECTOR OF AN AIRCRAFT

BACKGROUND OF THE INVENTION

The present invention relates to a method and to a device for displaying a velocity vector of an aircraft.

DESCRIPTION OF THE PRIOR ART

It is known that the display of a velocity vector which is intended to indicate the point in space toward which the aircraft is oriented (without however being representative of the amplitude of the velocity) may, in particular, be produced on a display screen of the aircraft's instrument panel or of a head-up display visor.

When an aircraft which is fit with such a device passes through a region of turbulence, the position of said velocity vector on the display screen is affected by the turbulence. Similarly, when the aircraft jettisons load, its flight path is temporarily disturbed, which leads to a variation in the position of the velocity vector displayed. However, in this case, at the end of a relatively short time, the aircraft returns to its initial flight path.

When the pilot notices a variation in the position of the velocity vector on the screen, he is tempted to act on a control column, in order to return the aircraft to its initial flight path. Since the disturbances in question (turbulence, jettisoning, etc.) have a limited effect over time on the flight path of the aircraft, the consequence of such a pilot action is a lasting modification of the flight path, that is to say an effect opposite to the desired effect. The pilot must, in this case, carry out a second action on the column, in a direction opposite to the direction of his first action, in order to return the aircraft to its initial flight path. In some situations, especially when passing through a region of turbulence, this second action may lead to too great a correction of the flight path. Other actions on the column are then necessary to succeed in stabilizing the aircraft on the desired flight path.

Of course, such a phenomenon, which can be likened to "pilot induced oscillations" must be prevented, since it may especially lead to accelerated fatigue of the aircraft structure and it monopolizes the attention of the pilot in phases of flight where he may have to undertake other actions.

A known solution making it possible to overcome this problem consists in filtering the display of the velocity vector by means of a low-pass filter having a time constant of between a few tenths of a second and a few seconds. This makes it possible to prevent the aforementioned phenomenon, but the result of this is a new problem: when the pilot desires to modify the flight path by acting on the control column, this low-pass filter introduces a delay between the modification of the flight path resulting from the action on the control column and the variation in the display of the velocity vector on the screen. This lack of ability to react hampers the judgement by the pilot of the effect of his action on the control column, which makes mastering such an action very difficult. This is because, if the pilot acts, for example, for too long on the control column, there is a risk of overshooting the desired flight path, which may lead to "pilot induced oscillations", as described above.

Moreover, document EP-0 366 164 proposes another solution consisting in displaying either a velocity vector corresponding to the actions of the pilot (controlled velocity vector), or the measured velocity vector. A switching device makes it possible to display one or other of these velocity vectors. Under "normal" flight conditions, corresponding to predefined velocity ranges, angle of incidence, load factor, etc., the controlled velocity vector is displayed. On the other and, when the aircraft operates outside these "normal" flight conditions, the measured velocity vector is displayed. During the switching between these two velocity vectors, filtering is applied to avoid discontinuity of the display.

However, this known solution has drawbacks. In particular, two different information items are displayed with a single symbol, which requires logic for changing over between these two information items, which may lead to possible problems of transition, of choice which is not always optimum between one or other information item, etc.

SUMMARY OF THE INVENTION

The object of the present invention is to overcome these drawbacks. It relates to a method for displaying a velocity vector of an aircraft, which makes it possible to generate a display:

which remains stable, even in the case of temporary disturbances in the flight path of said aircraft, due for example to turbulence or to jettisoning of load; and which is highly reactive, during consecutive variations of flight path, to at least one action of a pilot on a control member or column of the aircraft.

To this end, according to the invention, said method according to which:

a display value representing the value of said velocity vector to be displayed and dependent on a first term which comprises a measured and filtered value of the velocity vector is determined automatically and repetitively; and a characteristic sign illustrating said velocity vector, the position of which on said display screen is representative of said display value, is presented on a display screen, is noteworthy in that, in order to determine said display value:

the value of the time derivative of a velocity vector which is controlled by the pilot of said aircraft is determined;

a second term is calculated from said value of the derivative of the controlled velocity vector; and the sum of said first and second terms is calculated so as to form said display value.

Thus, by virtue of the invention, the aforementioned drawbacks can be overcome. This is because:

said first term which takes into account a filtered value of the (effective) measured velocity vector makes it possible to obtain a stable display of the velocity vector, even in the case of temporary disturbances of the flight path; and said second term which takes into account the derivative of the controlled velocity vector guarantees a suitable and high reactivity of the velocity vector display during variations in the flight path due to pilot actions, especially on a control column.

Furthermore, by virtue of continuously taking account (via a summator) of these two terms, and therefore of the measured velocity vector and of the controlled velocity vector, no transition logic is needed, unlike the solution proposed by the aforementioned document EP-0 366 164.

Advantageously:

said first term $\gamma_1$ is calculated from the following expression:

$$\gamma_1 = [1/(1+\tau_1 \times s)] \times \gamma_{mes}$$

in which:

s is the Laplace transform;

$\tau_1$ is a predetermined time constant; and $\gamma_{mes}$ represents the measured velocity factor; and said second term $\gamma_2$ is calculated from the following expression:

$$\gamma_2 = [\tau_2/(1+\tau_3 \times s)] \times \gamma_{der}$$

in which:

s is the Laplace transform;

$\tau_2$ and $\tau_3$ are predetermined time constants; and $\gamma_{der}$ represents the derivative of the velocity vector controlled by the pilot.

According to the invention, the time constants $\tau_1$, $\tau_2$ and $\tau_3$ may be determined as a function of various parameters, in particular as a function of the aircraft mass. These time constants may of course be different from each other. However, in a simplified embodiment, said time constants $\tau_1$, $\tau_2$ and $\tau_3$ are equal.

Moreover, advantageously, in order to determine the component of the display value in a (first) vertical direction, the derivative of the controlled velocity vector is determined by taking account of one of the following controls:

control of the load factor of the aircraft;

control of the inclination of the aircraft; and control of the derivative of the inclination of the aircraft.

By taking account of the control of the aircraft load factor, preferably, the derivative $\gamma_{der}$ of the controlled velocity vector $\gamma_{com}$ is calculated from the controlled variation of the load factor $\Delta N_{zpil}$, by using the following expression:

$$\gamma_{der} = (g/V) \times \Delta N_{zpil}$$

in which:

g is the acceleration due to gravity; and

V is the velocity of the aircraft.

Moreover, advantageously, in order to determine the component of the display value in a second direction which is lateral to the aircraft and orthogonal to said vertical direction, the derivative of the controlled velocity vector is determined from the control of the roll rate (angular velocity over the roll axis) of the aircraft.

The present invention also relates to a device for displaying a velocity vector of an aircraft and implementing the aforementioned method.

According to the invention, said device of the type comprising:

a first means for measuring the effective value of the velocity vector of the aircraft;

a computing unit for determining, automatically and repetitively, a display value representing the value of the velocity vector to be displayed, said computing unit comprising a filtering means which filters the value measured by said first means so as to form a first term; and a display unit for presenting on a display screen a characteristic sign illustrating said velocity vector whose position on said display screen is representative of said display value, is remarkable in that it comprises, in addition, a second means for determining the time derivative of a velocity vector controlled by an aircraft pilot, and in that said computing unit further comprises:

a computing means which determines a second term from said derivative of the controlled velocity vector; and a summator which sums said first and second terms so as to form said display value.

Moreover, the present invention relates to an aircraft, in particular a civil transport aircraft, which is fit with the aforementioned device.

BRIEF DESCRIPTION OF THE DRAWING

The single FIGURE of the appended drawing will make it clear to understand how the invention can be embodied. This FIGURE represents the block diagram of a device according to the invention.

DESCRIPTION OF THE PREFERRED EMBODIMENT(S)

The device 1 according to the invention and shown schematically in the FIGURE is on board an aircraft, for example a transport aircraft (not shown) and is intended to display a velocity vector of the aircraft on a display screen 2 of the latter, for example a screen of the instrument panel or a head-up display (HUD) visor.

Said device 1 comprises, in a known manner:

a means 3, of the usual type, for measuring the effective value of the velocity vector of the aircraft;

a computing unit 4 for determining, automatically and repetitively, a display value $\gamma_{dis}$ representing the value of the velocity vector to be displayed. Said computing unit 4 is connected to the means 3 by a connection 5 and comprises a filtering means 6, specified below, which filters the value measured by said means 3 so as to form a first term $\gamma_1$; and a display unit 7 which is connected by a connection 8 to the computing unit 4, which comprises the display screen 2 and which is intended to present on this display screen 2 a characteristic sign illustrating said velocity vector, the position of which on said display screen 2 is representative of said display value $\gamma_{dis}$.

Within the context of the present invention, the filtering (indicated above) of the measured velocity vector concerns an action which consists in filtering the value of the measured velocity vector by means of a low-pass filter (having a time constant of, for example, between a few tenths of a second and a few seconds), in order to make this value insensitive to temporary disturbances (for example less than a few [3, 4, etc.] seconds) of the flight path of the aircraft.

According to the invention, said device 1 comprises in addition, a means 9, of the usual type, for determining the (time) derivative of a (controlled) velocity vector controlled by an aircraft pilot, and said computing unit 4 further comprises:

a computing means 10 which is connected by a connection 11 to the means 9 and which determines a second term $\gamma_2$ from said derivative of the controlled velocity vector; and a summator 12 which is connected by connections 13 and 14 respectively to the filtering means 6 and to the computing means 10 and which sums said first and second terms so as to form said display value $\gamma_{dis}$.

Thus, by virtue of the invention, the display value $\gamma_{dis}$ which is used to produce the display comprises said first and second terms $\gamma_1$ and $\gamma_2$ which are such that:

said first term $\gamma_1$ which takes into account a filtered value of the (effective) measured velocity vector makes it possible to obtain a stable display of the velocity vector even in the case of temporary disturbances of the flight path, as indicated above; and simultaneously said second term $\gamma_2$ which takes into account the derivative of the controlled velocity vector guarantees a suitable and high reactivity of the velocity vector display, during variations in the flight path due to pilot actions, especially on a control column, and this in spite of the aforementioned filtering which is provided according to the invention (but which is limited to said first term $\gamma_1$).

Furthermore, by virtue of continuously taking account (via the summator 12) of these two terms $\gamma_1$ and $\gamma_2$, and therefore of the measured velocity vector and of the controlled velocity vector, no transition logic is needed, unlike, for example, the solution proposed by the aforementioned document EP-0 366 164.

In a preferred embodiment, the means 6 calculates said first term $\gamma_1$ from the following expression:

$$\gamma_1 = [1/(1+\tau_1 \times s)] \times \gamma_{mes}$$

in which:
  s is the Laplace transform;
  $\tau_1$ is a predetermined time constant; and
  $\gamma_{mes}$ represents the measured velocity factor.

Furthermore, preferably, said means 10 calculates said second term $\gamma_2$ from the following expression:

$$\gamma_2 = [\tau_2/(1+\tau_3 \times s)] \times \gamma_{der}$$

in which:
  s is the Laplace transform;
  $\tau_2$ and $\tau_3$ are predetermined time constants; and
  $\gamma_{der}$ represents the derivative of the velocity vector $\gamma_{com}$ controlled by the pilot.

In this case, the display value $\gamma_{dis}$ which is transmitted by the computing unit 4 to the display unit and which is formed by the sum of said first and second terms $\gamma_1$ and $\gamma_2$ can be written:

$$\gamma_{dis} = [1/(1+\tau_1 \times s)] \times \gamma_{mes} + [\tau_2/(1+\tau_3 \times s)] \times \gamma_{der}.$$

According to the invention, the time constants $\tau_1$, $\tau_2$ and $\tau_3$ may be determined as a function of various parameters, in particular as a function of the aircraft mass. These time constants may be different from each other. However, in a simplified embodiment, said time constants $\tau_1$, $\tau_2$ and $\tau_3$ are regarded as being equal.

It will be noted that satisfactory results are especially obtained with a filtering time constant $\tau_1$ substantially equal to 0.6 seconds and time constants $\tau_2$ and $\tau_3$ substantially equal to two seconds, in the case of a heavy or fairly heavy aircraft, for example a transport aircraft.

Moreover, the value $\gamma_{der}$ is determined as a function of the reference values (or controls) entered by the pilot, especially by means of the normal control column of the aircraft. Depending on the axis in question, these reference values may be expressed in different units. Thus, by way of nonlimiting example, along the vertical z-axis of a coordinate system linked to the aircraft (vertical slope of the aircraft), said reference values may be entered as a load factor $N_z$, as a slope derivative, as a slope, etc. When the reference value along this z-axis is expressed as a slope derivative, the value of $\gamma_{der}$ is equal to this reference value.

When it is expressed as a slope, the value of $\gamma_{der}$ is equal to the derivative of said reference value.

When it is expressed in another unit, it is worth converting it. For example, where it corresponds to a load factor $N_z$, it can be converted as indicated below.

It is known that the derivative $\gamma'$ of the velocity vector is substantially equal to the following value:

$$\gamma' \approx (g/V) \times \Delta N_z$$

where $\Delta N_z$ is the variation in the load factor $N_z$, g is the acceleration due to gravity and V is the velocity of the aircraft.

From this, the following expression can be deduced:

$$\gamma_{der} \approx (g/V) \times \Delta N_{zpil}$$

in which $\Delta N_{zpil}$ represents the variation in the load factor which is controlled by the pilot and which corresponds to the movement of the control column (or member).

In this preferred embodiment, we therefore have for the z-axis:

$$*\gamma_{dis} = [1/(1+\tau_1 \times s)] \times \gamma_{mes} + [\tau_2/(1+\tau_3 \times s)] \times (g/V) \times \Delta N_{zpil};$$

where
  if $\tau_1 = \tau_2 = \tau_3 = \tau$:

$$\gamma_{dis} = [1/(1+\tau \times s)] \times \gamma_{mes} + [\tau/(1+\tau \times s)] \times (g/V) \times \Delta N_{zpil}.$$

Along the y-axis (which is lateral to the aircraft and orthogonal to the vertical axis z) of a coordinate system associated with the aircraft (corresponding to the lateral parameters of the aircraft, especially course, side slip, roll), the reference values input by the pilot are, preferably, expressed in terms of roll rate, without that being limiting. This roll rate is an angular velocity over the roll axis, which makes it possible to determine at any instant the roll angle of the aircraft. A non zero roll angle leads to turning of the aircraft and the mechanical laws of flight make it possible consequently to calculate an acceleration Ay along said y-axis. In terms of units, acceleration is equivalent to a load factor. In a manner similar to the aforementioned example of transforming the load factor $N_z$ into a value $\gamma_{der}$ along the z-axis, this acceleration Ay may be transformed into a value $\gamma_{der}$ along the y-axis.

Moreover, along the x-axis (which represents the longitudinal axis of the aircraft and which is therefore orthogonal to the z- and y-axes) of a coordinate system associated with the aircraft, the reference values entered by the pilot mainly correspond to the thrust of the engines, controlled, for example, by means of the throttle. This thrust leads to an acceleration Ax along the longitudinal x-axis of the aircraft, which can be transformed into a value $\gamma_{der}$ along this x-axis, in a manner similar to the aforementioned transformations relating to the y- and z-axes.

Furthermore, it will be noted that, in the case of an HUD visor, the x-axis being perpendicular to the plane of said HUD visor, it is possible, in order to guarantee the clarity and readability of the display, to return the parameters associated with this x-axis to a display along the z-axis by a normal transformation called "total slope".

What is claimed is:

1. A method for displaying a velocity vector of an aircraft, a method in which:
  a display value representing the value of said velocity vector to be displayed and dependent on a first term which comprises a measured and filtered value of the velocity vector is determined automatically and repetitively; and a characteristic sign illustrating said velocity vector, the position of which on said display screen is representative of said display value, is presented on a display screen, wherein, in order to determine said display value:
the value of the time derivative of a velocity vector which is controlled by the pilot of said aircraft is determined;
a second term is calculated from said value of the derivative of the controlled velocity vector; and
the sum of said first and second terms is calculated so as to form said display value.

2. The method as claimed in claim 1, wherein said first term $\gamma_1$ is calculated from the following expression:

$$\gamma_1 = [1/(1+\tau_1 \times s)] \times \gamma_{mes}$$

in which:
s is the Laplace transform;
$\tau_1$ is a predetermined time constant; and
$\gamma_{mes}$ represents the measured velocity factor.

3. The method as claimed in claim 1, wherein said second term $\gamma_2$ is calculated from the following expression:

$$\gamma_2 = [\tau_2/(1+\tau_3 \times s)] \times \gamma_{der}$$

in which:
s is the Laplace transform;
$\tau_2$ and $\tau_3$ are predetermined time constants; and
$\gamma_{der}$ represents the derivative of the velocity vector controlled by the pilot.

4. The method as claimed in claim 2, wherein said time constants $\tau_1$, $\tau_2$ and $\tau_3$ are equal.

5. The method as claimed in claim 1, wherein, in order to determine the component of the display value in a vertical direction, the derivative of the controlled velocity vector is determined by taking account of one of the following controls:
control of the load factor of the aircraft;
control of the inclination of the aircraft; and
control of the derivative of the inclination of the aircraft.

6. The method as claimed in claim 3, wherein the derivative $\gamma_{der}$ of the controlled velocity vector is calculated from the controlled variation of the load factor $\Delta N_{zpil}$ of the aircraft, by using the following expression:

$$\gamma_{der} = (g/V) \times \Delta N_{zpil}$$

in which:
g is the acceleration due to gravity; and
V is the velocity of the aircraft.

7. The method as claimed in claim 1, wherein, in order to determine the component of the display value in a direction which is lateral to the aircraft and orthogonal to the vertical direction, the derivative of the controlled velocity vector is determined from the control of the roll rate.

8. A device for displaying a velocity vector of an aircraft, said device comprising:
a first means for measuring the effective value of the velocity vector of the aircraft;
a computing unit for determining, automatically and repetitively, a display value representing the value of the velocity vector to be displayed, said computing unit comprising a filtering means which filters the value measured by said first means so as to form a first term; and
a display unit for presenting on a display screen a characteristic sign illustrating said velocity vector whose position on said display screen is representative of said display value, which device comprises, in addition, a second means for determining the time derivative of a velocity vector controlled by an aircraft pilot, and in that said computing unit further comprises:
a computing means which determines a second term from said derivative of the controlled velocity vector; and
a summator which sums said first and second terms so as to form said display value.

9. An aircraft, which comprises a display device such as the one specified in claim 8.

* * * * *